March 22, 1927.

S. B. LINDLEY 1,621,744

GRADING TABLE FOR VEGETABLES AND FRUITS

Filed March 20, 1925

INVENTOR.
STACEY B. LINDLEY.

BY

ATTORNEYS.

Patented Mar. 22, 1927.

1,621,744

UNITED STATES PATENT OFFICE.

STACEY B. LINDLEY, OF INDIANAPOLIS, INDIANA, ASSIGNOR TO INDIANA CANNING MACHINERY COMPANY, OF INDIANAPOLIS, INDIANA, A CORPORATION.

GRADING TABLE FOR VEGETABLES AND FRUITS.

Application filed March 20, 1925. Serial No. 17,018.

This invention pertains to a grading table of the endless belt type such as shown in the patent to Powers, No. 1,474,440, issued November 20, 1923, for sorting and grading with respect to sizes, tomatoes, fruits or the like for canning or marketing purposes.

The principal feature of the invention lies in the structure of the endless grading belt and its mounting which is an improvement over those heretofore employed with respect to various features as will hereinafter be more fully set forth and claimed.

One feature of the belt resides in the rigid links extending completely across the table and directly supported at their ends upon the endless driving chain at each side of the belt. This presents a relatively flat and smooth table surface elevated and sloped at points intermediate its ends for permitting the tomatoes or the like to roll about the surface thereof so as to more readily drop through the apertures, whereas heretofore such grading belts have been made of a plurality of links such as to cause them to sag and to present obstructions on their surfaces for preventing the free movement of the tomatoes or the like in finding an aperture through which they may pass.

Another feature of the invention resides in the structure of the belt whereby there are fewer parts and less assembling so as to provide a more commercial and substantial article at a more reasonable cost of production, and means for discharging such tomatoes or the like as may become lodged in the holes.

The full nature of the invention will be understood from the accompanying drawings and the following description and claims.

Figure 1:
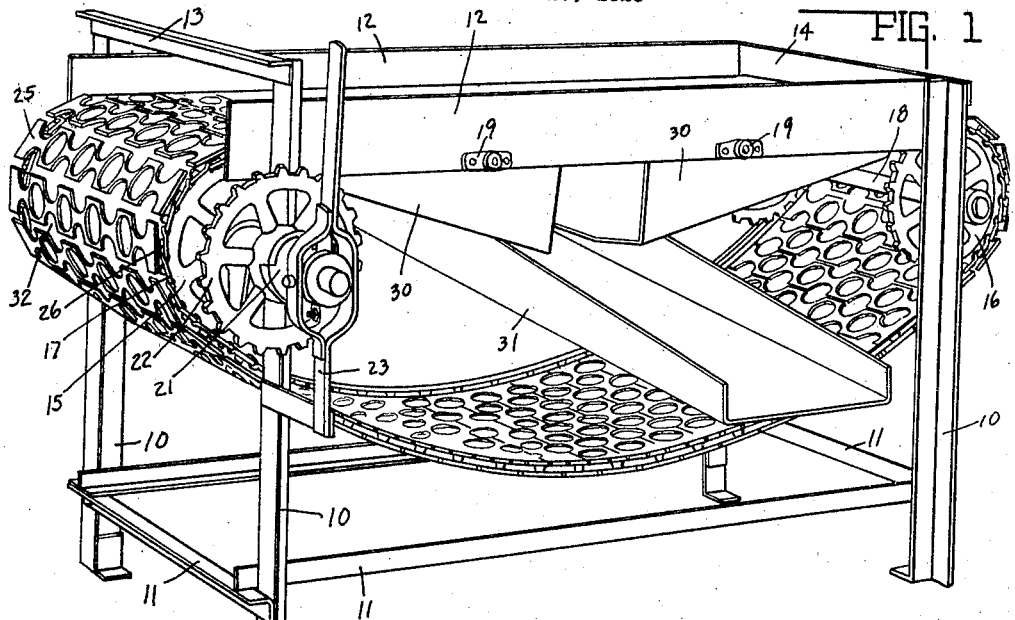
Figure 2:
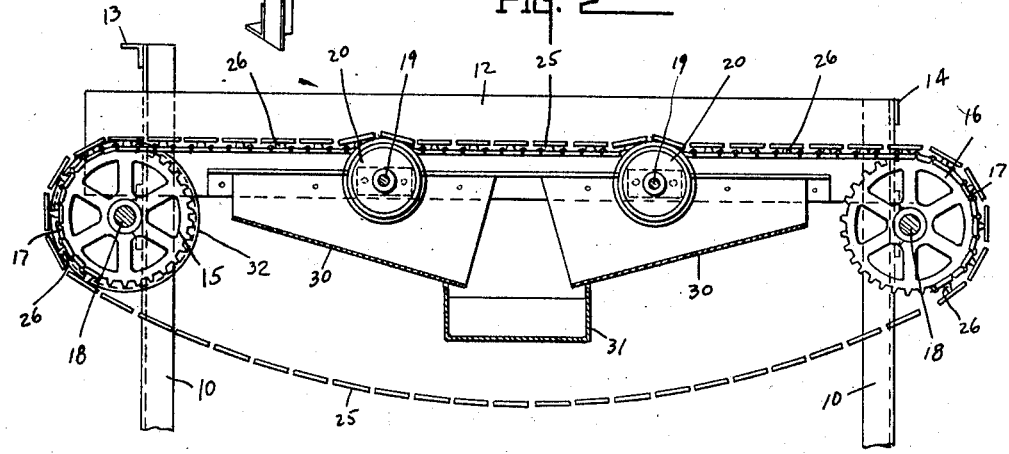
Figure 3:
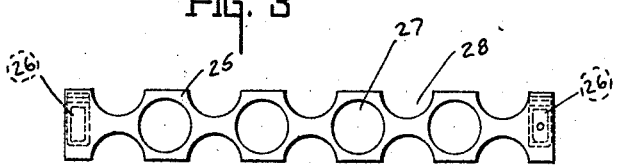

In the drawings, Figure 1 is a perspective view of the grading table. Fig. 2 is a side elevation thereof. Fig. 3 is a plan view of one of the belt sections.

In the drawings there is shown a grading table having a frame comprising the legs 10 and lower side and end bars 11. At the top portion of the legs there are provided side boards 12 between which the endless grading belt is adapted to pass. The top of the legs are joined by the top cross bars 13 and 14. At each end of the table mounted in suitable bearings secured to the respective legs, there are sprockets 15 and 16 about which the endless chains 17 are adapted to pass, there being a pair of sprockets on each side of the table mounted on the shafts 18, and a chain on each side thereof adapted to extend about each pair of sprockets so as to pass across the top of the table adjacent the side boards 12. Mounted in suitable bearings on the lower edge of the side boards 12, there are shafts 19 adapted to carry the supporting rollers 20 which extend under the belt and slightly above the surface thereof throughout its entire width so as to cause a slight raise in the belt as it passes thereover. This roller has two functions, first it varies the elevation of the belt so as to cause the tomatoes or the like to turn over and roll thereon into the holes, and secondly, the rollers act to force from the holes any tomatoes or the like which may have become lodged therein.

The sprockets 15 are the driving sprockets and are keyed to the drive shaft 18. The shaft is driven through a clutch member 21 by a driving sprocket 22 which is loosely mounted on said shaft, said clutch member being operated through a clutch lever 23 supported upon one of the legs 10. When power is applied to the table through the sprocket 22 and the clutch is thrown into engagement, the endless grading belt will be caused to slowly pass about the ends of the table between the side boards 12, said chain being substantially flat passing over the top, as shown in Fig. 2, and sagging down towards the bottom of the table while passing thereunder, as shown in Figs. 1 and 2.

The endless grading belt is constructed of a plurality of sections 25, as shown in Fig. 3. Said sections are rigid and are of a length substantially that of the width of the table. They are preferably formed of malleable iron, but may be stamped out of relatively heavy sheet metal. On each end of the section there is secured a block 26 adapted to be rigidly connected with every other link of the endless carrying chain 17 so as to rigidly support the section thereon, and spaced therefrom in parallel relation. The section is provided with a plurality of annular apertures 27 centrally positioned longitudinally thereof of a given diameter. The diameter, of course, is predetermined with respect to a product to be graded, so that the smaller or poorer grades may readily pass therethrough, but the better or larger grades will be carried thereupon. In staggered relation with respect to the apertures 27, there are semi-circular recesses 28 formed along each edge of the section so that when the sections are placed side to side as they are carried across the top of the table, the semi-circular recesses 28 will form with the corresponding recesses of the adjacent section of annular apertures, such as the apertures 27. Therefore, when the sections are passing across the top of the table in horizontal position, they will present a flat surface provided with a plurality of annular apertures in staggered relation with respect to each other. By reason of the nature of the sections, and their relation to each other, the surface presented thereby will be substantially flat and void of any irregularities or obstructions tending to prevent the free flow of the products thereover, with the exception of the proper apertures.

Secured to the side boards 12 and extending under the top portion of the belt there are inclined pans 30, extending downwardly toward each other to the center of the table, and open at their lower ends which are spaced apart, as shown in Fig. 2, so that the products passing through the apertures in the belt will be discharged thereby into a discharge chute 31. However, the discharge chute 31 may be in the form of an endless conveying belt if desired. The better grade of the products to be graded will be carried from the right hand to the left hand end of the table upon the belt, and will there be discharged onto any suitable conveying means or into a suitable discharge chute.

Carried by the shaft 18 and positioned between the sprockets 15 and 16 there is a drum 32 about which the belt passes. The drum is of such diameter that its surface extends adjacent to the entire surface of the sections 25 so that the tomatoes or the like which may have become lodged in the holes may be forced therefrom at the end of the table as the belt passes about said drum and before the same are discharged into the discharge chute.

The invention claimed is:

1. A horizontally extending smooth surfaced grading belt of the character described comprising a pair of endless chains, a plurality of rigid plates extending from one chain to the other and secured thereto at their respective ends independently of each other, each of said plates having a plurality of annular openings positioned centrally and longitudinally thereof, and a plurality of semi-annular recesses formed along the edges thereof in staggered relation to said openings for forming similar openings in conjunction with the edges of the adjacent plates.

2. A grading belt of the character described, comprising a pair of endless chains having a plurality of relatively long and narrow rigid plates extending the full width of said belt, and having their ends connected to the respective links on said chains, said plates being so formed as to provide a relatively smooth and uninterrupted horizontal surface when brought to operating position, and means for engaging said plates and tilting them at an angle to the relative smooth surface upon their passage thereover.

3. A grading belt of the character described, comprising a pair of endless chains having a plurality of relatively long and narrow rigid plates extending the full width of said belt, and having their ends connected to the respective links on said chains, said plates being so formed as to provide a relatively smooth and uninterrupted horizontal surface when brought to operating position, and a plurality of rollers mounted adjacent the underside of said belt in position to engage said plates as they pass thereover and cause the horizontal edges thereof to be tilted so as to incline said plates with respect to the surface of the belt during their passage thereover.

In witness whereof I have hereunto affixed my signature.

STACEY B. LINDLEY.